United States Patent
Wewers et al.

(10) Patent No.: US 9,575,779 B1
(45) Date of Patent: Feb. 21, 2017

(54) ISOLATED COMMUNICATION STRUCTURE FOR MACHINE INSTRUMENTS

(71) Applicant: epro GmbH, Gronau (DE)

(72) Inventors: Thomas Wewers, Stadtlohn (DE); Uwe Tegeder, Salzbergen (DE); Sven Wermers, Gronau (DE)

(73) Assignee: epro GmbH, Gronau (DE)

( * ) Notice: Subject to any disclaimer, the term of this patent is extended or adjusted under 35 U.S.C. 154(b) by 0 days.

(21) Appl. No.: 15/055,094

(22) Filed: Feb. 26, 2016

(51) Int. Cl.
*G06F 3/00* (2006.01)
*G06F 9/445* (2006.01)
*G06F 9/54* (2006.01)

(52) U.S. Cl.
CPC ....... *G06F 9/44526* (2013.01); *G06F 9/44536* (2013.01); *G06F 9/54* (2013.01)

(58) Field of Classification Search
CPC .......................................................... G06F 9/54
USPC ............................................................ 719/310
See application file for complete search history.

(56) References Cited

U.S. PATENT DOCUMENTS 6,148,336 A * 11/2000 Thomas ............. H04L 41/0893
709/223
6,789,157 B1 * 9/2004 Lilja ......................... G06F 8/65
711/102
2003/0184783 A1 10/2003 Shahindoust et al.
2008/0178202 A1 * 7/2008 Blackman ............ G06F 13/385
719/327
2013/0247073 A1 9/2013 Keeney et al.

OTHER PUBLICATIONS

Peter J. Young, Achieving Design Reuse: A Case Study, 2008.*

* cited by examiner

*Primary Examiner* — Lechi Truong
(74) *Attorney, Agent, or Firm* — Ludeka Neely Group, P.C.; Rick Barnes

(57) ABSTRACT

A centralized system for communicating with machine instruments, includes a processor, a memory, a communication port, and a communication module. The communication module has a set of sockets for communicating through the communication port, and a library of plugins, where each plugin is associated with at least one of the machine instrument types and firmware version. A plugin manager communicates with a selected one of the machine instruments and searches the plugin library to find a plugin that is compatible with the type and firmware version of the selected machine instrument. A compatible plugin is associated with the selected socket, such that the compatible plugin interprets communication between the centralized system and the machine instrument. The associating occurs without altering associations between other plugins and sockets and interrupting communications between the centralized system and any of the other machine instruments.

17 Claims, 4 Drawing Sheets

ISOLATED COMMUNICATION STRUCTURE FOR MACHINE INSTRUMENTS

FIELD

This invention relates to the field of protection and predictive maintenance for Assets. More particularly, this invention relates to electronic communication between machine health instruments and machine protection instruments (jointly and severally referred to as machine instruments herein) that gather machine data such as machine health data, machine protection data, and machine prediction data, and centralized systems that receive machine data from the machine instruments.

INTRODUCTION

Most machines require some type of monitoring, protection and servicing in order to maintain operational condition or to protect against dangerous situation. As used herein, the term "machine" is given a broad definition, and includes equipment such as might be found in industrial applications. Such machinery, for example, includes rotating machines such as pumps, presses, grinders, compressors, generators, shop equipment, and other types of equipment.

Predictive maintenance and protection regimes gather data in regard to the health of a machine on a regular basis or ongoing, such as by using some kind of machine instrument. Different kinds of machine instruments sense different kinds of machine properties, such as vibration, temperature, pressure, valve position, sound, infrared emission, oil condition, pressure, flow rate, electrical consumption, liquid or gas leakage, and so forth.

Many machine instruments are capable of electronic communication, such as over a network, and thus can send machine health data to another system, and receive instructions from another system, such as over a network data connection. Centralized systems are used to collect data from and send instructions to a plurality of such machine instruments, and store, analyze, and correlate the data that they receive.

This communication is governed at least in part by the software that is embedded in and controls the basic operation of the machine instrument. Such embedded software is typically referred to as firmware.

As updates to the machine instrument occur, the firmware in the machine instrument is changed. Similarly, if the machine instrument is replaced with a different or newer model of the machine instrument, the firmware of the new machine instrument is typically different from that of the old machine instrument. Sometimes, the firmware of the machine instrument is rolled back to an older version of the firmware for some reason.

These changes in the firmware of the machine instruments creates problems for the centralized system that is trying to communicate with the machine instruments, because the software in the centralized system must understand the communication protocol used by and the capabilities of each machine instrument, and whenever the firmware changes, the centralized system typically cannot fully communicate with and utilize a given machine instrument until the software of the centralized system is updated.

Typically, changes in the firmware version of any one of the machine instruments has required taking the centralized system offline, such that it is no longer performing any of its functions in regard to any of the machine instruments, until it can be updated to communicate with the new firmware version of a single one of the many machine instruments with which it might communicate. This is not only time consuming and expensive, but requires the centralized system to be down and not performing its vital functions until it is updated and brought back online.

What is needed, therefore, is a system that reduces issues such as those described above, at least in part.

SUMMARY

The above and other needs may be met by a centralized system for communicating with machine instruments of differing types, where operation of the machine instruments is determined by a firmware version that is independently and selectively updatable for each machine instrument. The centralized system includes a processor, a memory, a communication port, and a communication module with instructions residing in the memory and executed by the processor. The communication module controls communication between the centralized system and the machine instruments through the communication port. The communication module has a set of sockets for communicating through the communication port, a plugin manager, and a library of plugins, where each plugin is associated with at least one of the machine instrument types and at least one firmware version.

The plugin manager communicates with a selected one of the machine instruments through a selected one of the sockets and determines the type and the firmware version of the selected machine instrument, searches the plugin library to find a plugin that is compatible with the type and firmware version of the selected machine instrument, and associates a compatible plugin with the selected socket such that the compatible plugin interprets communication between the centralized system and the machine instrument. Associating occurs without altering associations between other plugins and sockets and interrupting communications between the centralized system and any of the other machine instruments.

In some embodiments, the compatible plugin receives data in a first message from the associated machine instrument according to a first data protocol that is dependent upon the type and firmware version of the machine instrument, extracts the data from the first message, converts the data into a second data protocol associated with the centralized system, and sends the data in a second message according to the second protocol elsewhere in the centralized system.

In some embodiments, the compatible plugin receives instructions from the centralized system in a third message according to the second data protocol, extracts the instructions from the third message, converts the instructions into the first data protocol, and sends the instructions in a fourth message according to the first protocol to the associated machine instrument.

In some embodiments the communication module includes instructions for adding a new plugin to the plugin library when the plugin manager fails to find a plugin in the plugin library that is compatible with the type and firmware version of the selected machine instrument. In some embodiments the communication module requests a designation of the new plugin from a user interface attached to the centralized system. In some embodiments the communication module at least one of (1) requests a designation of the new plugin, and (2) receives the new plugin, from a global network source attached to the centralized system. In some embodiments the communication module receives the new plugin from a removable memory unit attached to the centralized system. In some embodiments the plugin library is contained in a portion of the memory that is removable from the centralized system.

According to another aspect of the invention there is described a method for communicating between a centralized system and machine instruments of differing types, where operation of the machine instruments is determined by a firmware version that is independently and selectively updatable for each machine health instrument. A connection between one of the machine instruments and the centralized system is detected at a socket of the centralized system. A plugin manager of the centralized system requests and receives from the machine instrument a type and a firmware version of the machine instrument, and then searches a library of plugins for a compatible plugin that matches the type and firmware version of the machine instrument. Each plugin in the library is associated with at least one of the machine instrument types and at least one firmware version. The plugin manager associates the compatible plugin with the socket such that the compatible plugin interprets communication between the centralized system and the machine instrument. The associating occurs without altering associations between other plugins and sockets and interrupting communications between the centralized system and any other machine instruments.

According to yet another aspect of the invention there is described a non-transient, computer-readable medium containing a machine program for enabling a computer to communicate with machine instruments of differing types, where operation of the machine instruments is determined by a firmware version that is independently and selectively updatable for each machine instrument, by causing a processor of the computer to perform the steps of the method as described herein.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

Figure 1:
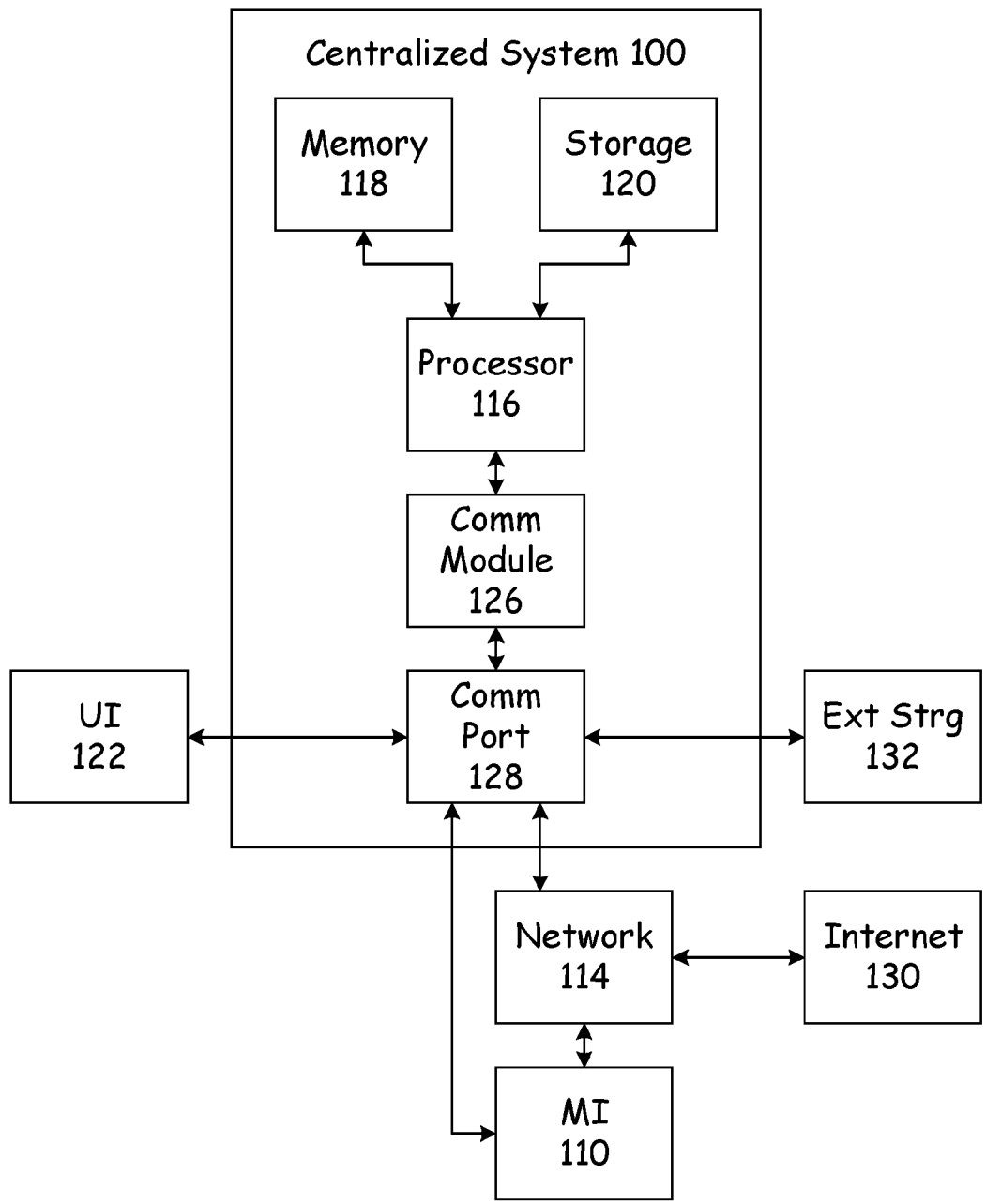
FIG. 1 is a functional block diagram of a centralized system according to an embodiment of the present invention.

With reference now to the figures, there is depicted in FIG. 1 a centralized system 100 according to an embodiment of the present invention. The centralized system 100 includes a processor 116, memory 118, data storage unit 120, communication module 126, and communication port 128. In some embodiments the centralized system 100 is a general purpose computer that is specially programmed to perform the functions as described herein. In other embodiments, the centralized system 100 is a customized piece of hardware. It is appreciated that the various components of the centralized system 100 would have many more connections than the few that are depicted in the figures, such as on system-wide buses. Thus, it is understood that the communication lines as depicted are representational in nature, and in some embodiments the communication module 126 can communicate directly with at least one of the memory 118 and the data storage unit 120, for example.

The memory 118 is a hardware structure that is, in various embodiments, a combination of volatile and non-volatile memory, such as various types of RAM. The memory 118 contains the operational programming for the centralized system 100, the data that is collected by the centralized system 100, information in regard to the external hardware that is communicating with the centralized system 100, and other information as generally described herein.

The storage 120 is non-volatile hardware structure such as a hard drive, a solid state drive, an array of such, or other electronic data storage structures as presently known in the art. It is appreciated that in some embodiments, portions of the storage 120 can be remote to the rest of the centralized system 100.

For the sake of simplicity, the communication functions of the centralized system 100 are divided into two structures, the communication module 126 and the communication port 128. It is difficult—if not impossible—to split, in modern computing systems, those structures that are purely hardware from those structures that are purely software. Almost every integrated computing structure is a combination of both at some level. With that caveat it is indicated that in general, the communication port 128 contains the hardware aspects of the communication functions of the centralized system 100, and the communication module 126 contains the software aspects of the communication functions of the centralized system 100. Neither would be of any use without the other, and require each other to provide the communications for the centralized system 100.

The communication port 128 contains all of the various hardware port structures that enable communication between the local portions of the centralized system 100 and hardware that is external to the centralized system 100. For example, a user interface 122, such as might include a display, a pointing device, a printer, a camera, a speaker, a microphone, and other similar hardware, connects to the centralized system 100 through appropriate hardware structures of the communication port 128. Similarly, an external storage device 132, such as USB memory stick, connects to the centralized system 100 through an appropriate hardware structure of the communication port 128.

In some embodiments the communication port 128 includes a network connection for connection to a data network 114, such as a local general communication network or a specialized network. The network 114 can in turn be connected to a global data communication network, such as the Internet 130.

The communication module 126 is the software that controls the operation of the hardware communication port 128. The software may at times be stored in at least one of the memory 118 and the data storage unit 120, or may be more permanently disposed within non-volatile memory structures of the communications port 128. The processor 116 is used to load, as needed, the appropriate control routines and drivers that constitute portions of the communication module 126 into the appropriate structures of the communication port 128.

The centralized system 100 communicates with a data source 110 through the communication module 126 and communication port 128. This communication can either be through a shared general purpose data communication line such as the network 114 or a USB connection, or through some kind of direct and individual communication line such a serial port. The data source 110 may be a single machine instrument, multiple machine instruments on a single machine, multiple machine instruments on different machines, or another centralized system 100. For simplicity, the examples given herein describe communication with a machine instrument 110. The operation of the communication module 126 in regard to communication with the machine instrument 110 is described in more detail hereafter.

The system 100 provides certain core functionality for communicating with a machine instrument 110, and collects and interprets data from the machine instruments 110. At least one of the memory 118 and the data storage unit 120 may include software specific to machine instruments 110 for operation of the processor 116. Data that is collected or generated by the processor 116 may be stored for future use in the storage device 120 of the centralized system 100, or elsewhere. The data collected by the centralized system 100 from the machine instruments 110 may include, but is not limited to, oil analysis, infrared analysis, device configuration, machine diagnostics, machine protection, and so forth. Operational and warning messages to a technician may be output to the user interface 122.

One advantage of the centralized system 100 is that it provides a basic framework that can leverage common data collection services and applications for a wide variety of machine instruments 110 without duplicating the entire centralized system 100. The centralized system 100 provides a standard mechanism for sharing information from different machine instruments 110 without using a dedicated centralized system 100 for each machine instrument 110. The centralized system 100 also provides the technician with consistency for common monitoring or protection services and applications when there are multiple machines monitored by the same centralized system 100.

Figure 2:
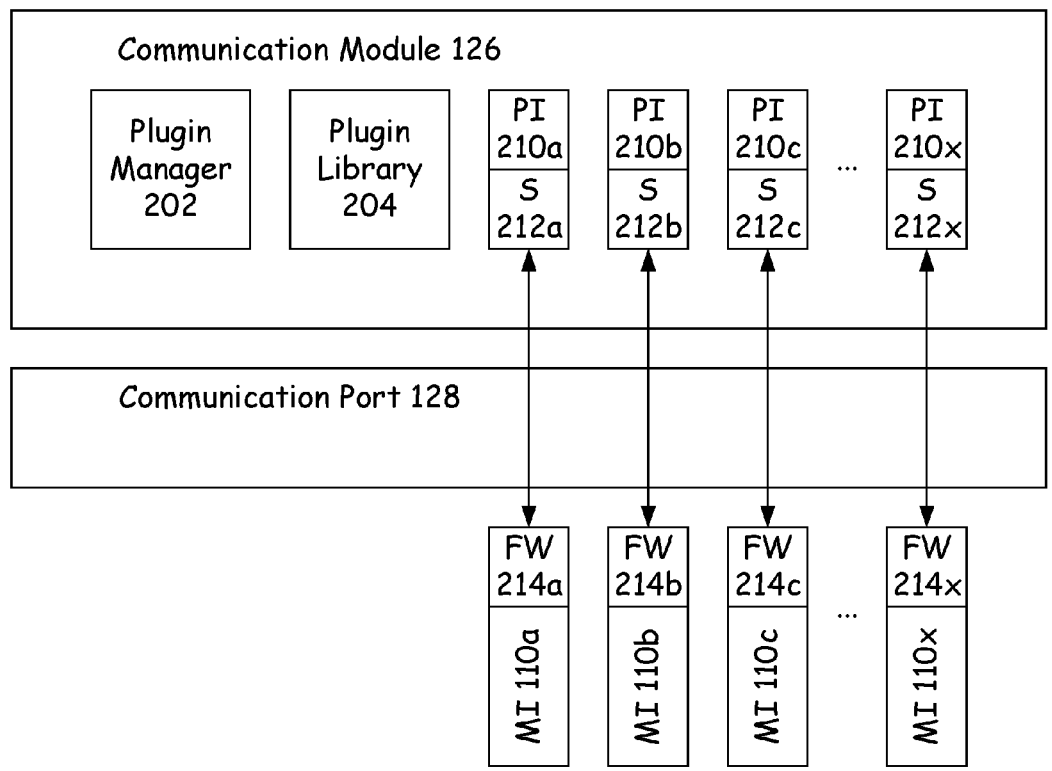
FIG. 2 is a more detailed functional block diagram of a portion of the centralized system according to an embodiment of the present invention.

With reference now to FIG. 2, there is depicted the communication module 126 in greater detail. In the embodiment as depicted, the communication module 126 includes a plugin manager 202, a plugin library 204, and a plurality of sockets 212, through which the centralized system 100 communicates with the machine instruments 110.

Again it is mentioned that the communication module 126 generally represents the software portions of the communication functions of the centralized system 100. Thus, the plugin manager 202, in some embodiments, makes use of hardware that might be part of the communication port hardware structures 128, or in some embodiments might make use of the computing power of the processor 116. Further, the software of the plugin manager 202 in some embodiments resides within at least one of the memory 118 and the data storage unit 120.

One function of the plugin manager 202 is to detect when a machine instrument 110 has been connected to the centralized system 100 and is attempting to communicate with the centralized system 100. Such connections are described herein as occurring through the sockets 212. In some embodiments these sockets 212 are specific addresses within the memory 118, which are checked for the presence of data. The sockets 212 can also represent structures such as a protocol layer. Other structures for a communication socket 212 are known to those with skill in the art. It is appreciated that any number of sockets 212 may be present in the centralized system 100, but only four are depicted for convenience.

As depicted in FIG. 2, each of the machine instruments 110 communicate with the centralized system 100 through a different socket 212, even though they may all communicate on the same network connection 114. Such physical connections are generally depicted as being handled by the communication port 128 in FIG. 2.

As introduced above, the firmware 214 associated with each of the machine instruments 110 might be different, in that they might assemble their data packets differently, provide access to different functions of the machine instruments 110 with which they are associated, and so forth.

In order to understand the communication protocol required by the firmware 214 of each of the machine instruments 110, the plugin manager 202 associates with each socket 212 a plugin 210 that is designed to communicate with the firmware 214 that is associated with the machine instrument 110 that is communicating through that socket 212. The plugins 210 are software structures that in one embodiment are specific to both the centralized system 100 and a given one or more of the machine instruments 110. The plugins 110 provide instructions to at least one of the processor 116 and the communication module 126, in one embodiment, so that they can translate or otherwise enable communication and commands between the centralized system 100 and the machine instrument 110 that is associated with the plugin 210. The plugin 210, in some embodiments, is configured to make available, implement, and control all the various features and functions of the associated machine instrument 110.

These plugins 210 are kept in a plugin library 204. The plugin library 204 is included in the depiction of the communication module 126 because of its functional association with the operation of the communication module 126. However, in some embodiments that plugin library 204 is software that is stored in at least one of the memory 118 and the storage 120, and accessed as needed.

Figure 3:
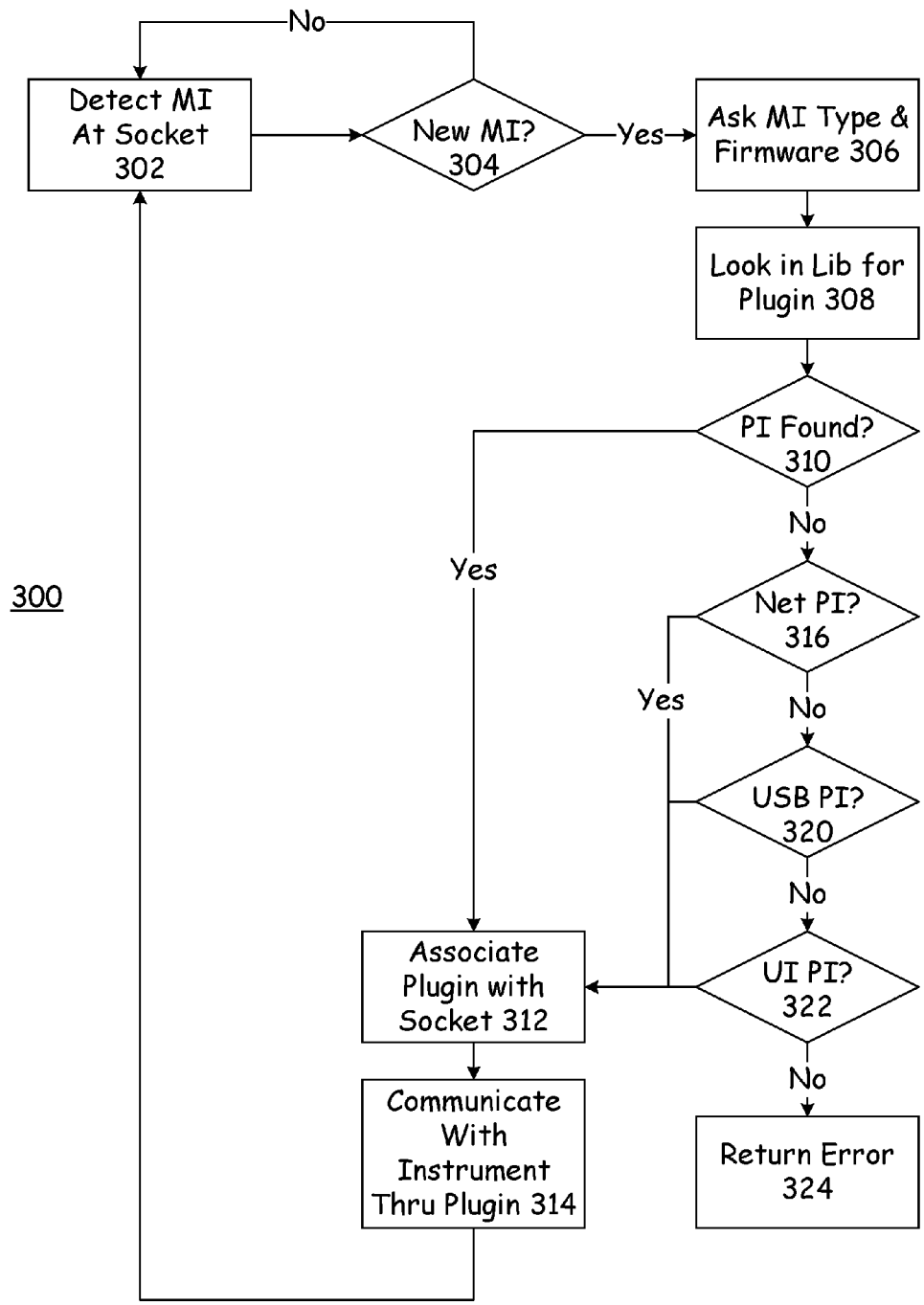
FIG. 3 is a flow chart for the operation of a centralized system according to an embodiment of the invention.

The operation of the communication module 126 is described in reference to FIG. 3, in which there is depicted a flow chart of a method 300. The process starts at block 302, in which the communication module 126 looks for a machine instrument 110 that is newly connected to the centralized system 100 through a socket 212. An equivalent event is when the same machine health instrument 110 is connected to a given socket 212, but the firmware 214 associated with the machine health instrument 110 has changed. Decision block 304 indicates the loop that continually looks for the connection of a new machine health instrument 110. If no new machine instrument 110 is detected, then the communication module 126 takes no further action in regard to the process as described below, but just continues to monitor the sockets 212 for such an occurrence.

When the communication module 126 does detect the presence of a new machine instrument as given in block 304, then the communication module 126 interrogates the machine instrument 110 to determine identifying information, such as the type of machine instrument 110 and the version of the firmware 214 associated with the machine instrument 110, as given in block 306.

Once the communication module 126 has received the identification information that is needed, it looks in the plugin library 204 for a plugin 210 that is compatible with the firmware 214. This can be done by directly inspecting each plugin 210 in the plugin library 204, or by consulting an index of the plugins 210 in the plugin library 204, for example.

If an appropriate plugin 210 is found as given in block 310, then the appropriate plugin 210 is associated with the socket 212 on which the new machine instrument 110 was attached, as given in block 312, and is used to interpret the communication between the centralized system 100 and the machine health instrument 110, as given in block 314, and described at a later point below in more detail.

In some embodiments more than one appropriate plugin 210 is found. In such an instance, the plugin manager 202 can implement one of several different options. For example, in one embodiment the plugin manager 202 selects one of the appropriate plugins 210 with the latest revision date. In another embodiment, the plugin manager 202 selects one of the appropriate plugins with a known history of operability with the associated machine instrument 110. In yet another embodiment, the plugin manager 202 selects one of the appropriate plugins 210 with a known, desired functionality. In still another embodiment, the plugin manager 202 requests input to determine which plugin 210 to select, such as by making a request that is delivered to the user interface 122.

The method 300 then returns to block 302, to determine whether there are any other newly connected machine instruments 110 that need to be properly associated with a socket 212 and a plugin 210, as described above.

However, in some instances an appropriate plugin 210 might not be found in the plugin library 204, as determined in block 310. In such an occurrence, some embodiments of the method 300 of operation of the communication module 126 go through a series of steps in an attempt to find an appropriate plugin 210, by looking at various data sources that might be available to the centralized system 100. For example, the communication module 126 can ask for either a designation of the appropriate plugin 210, or the appropriate plugin 210 itself, from a web site or other data source on a global network system, such as the Internet, as given in block 316. For example, the communication module 126 in some embodiments is able to use the information from the machine instrument 110 as gathered in block 306 to go to an appropriate Internet address for the machine instrument 110, and download an appropriate plugin 210, with control then falling once again to block 312.

However, if the appropriate plugin 210 is not received from the user interface 122, then another resource is queried as given in block 320, such as at an external storage location, as given in block 320, such as a USB flash drive or some other such medium.

If, once again, the appropriate plugin 210 is not found in that manner, then the communication module 126 can look for the appropriate plugin 210 such as from the user interface 122, as given in block 322. If the user interface 122 is able to provide the appropriate plugin 210, then the method falls to block 312 and the process proceeds as described above.

If none of the resources available to the communication module 126 are able to provide the appropriate plugin 210, then an error message is output, such as to the user interface 122 or out on the network 114, as given in block 324.

It is appreciated that the sources for plugins 210 as given above are exemplary in nature, and that other sources are comprehended, as are different numbers of sources and different order of sources. Further, in addition to returning an error code, the communication module 126 can, in some embodiments, associate with the appropriate socket 212 one of a series of default plugins 210. While the default plugin 210 would probably not provide full compatibility with the machine instrument 110, the default plugin 210 will provide some basic communication with the machine instrument 110 until an appropriate plugin 210 that provides full compatibility with the machine instrument 110 can be found and associated with the socket 212.

The method 300 is performed independently for each of the sockets 212 and attached machine instruments 110, such that while the communication module 126 is searching for and associating an appropriate plugin 210 with a socket 212, the other machine instruments 110 continue to communicate with the centralized system 100 through their sockets 212 without any interruption whatsoever. Thus, there is no down time at all for the centralized system 100 in regard to changing machine instruments 110 or firmware 214.

Accordingly, in order to accommodate a wide variety of machine instruments 110 and firmware 214 updates or function changes, a given plugin 210 is used to support a specific type and firmware version of the machine instruments 110. By using plugins 210, reprogramming the centralized system's 100 overall operational software can be avoided. Each plugin 210 is suitably coordinated with one or more type and version of the machine instrument's 110 firmware 214. Each plugin 210 works independently from other plugins 210, so that the plugin 210 can be tested independently. Furthermore, new plugins 210 can be added without influencing existing plugins 210 or without testing the existing software for the centralized system 100.

In some embodiments, the communication data provided by the communication module 126 from the machine instruments 110 to the system 100 is converted into a common data format, even though the data as originally sent from the machine instruments 110 is, in some embodiments, received in a format that is different from the common data format and proprietary to the machine instrument 110 type and firmware 214. This data conversion is enabled by the plugin 210 that is associated with the socket 212 through which the machine instrument 110 communicates with the centralized system 100.

Similarly, in some embodiments, the instructions provided by the communication module 126 from the system 100 to the machine instruments 110 are converted into a proprietary format, even though the instructions as originally sent from the centralized system 100 are, in some embodiments, in a format that is different from the proprietary instruction format of the machine instrument 110. This instruction conversion is once again enabled by the plugin 210 that is associated with the socket 212 through which the machine instrument 110 communicates with the centralized system 100.

Figure 4:
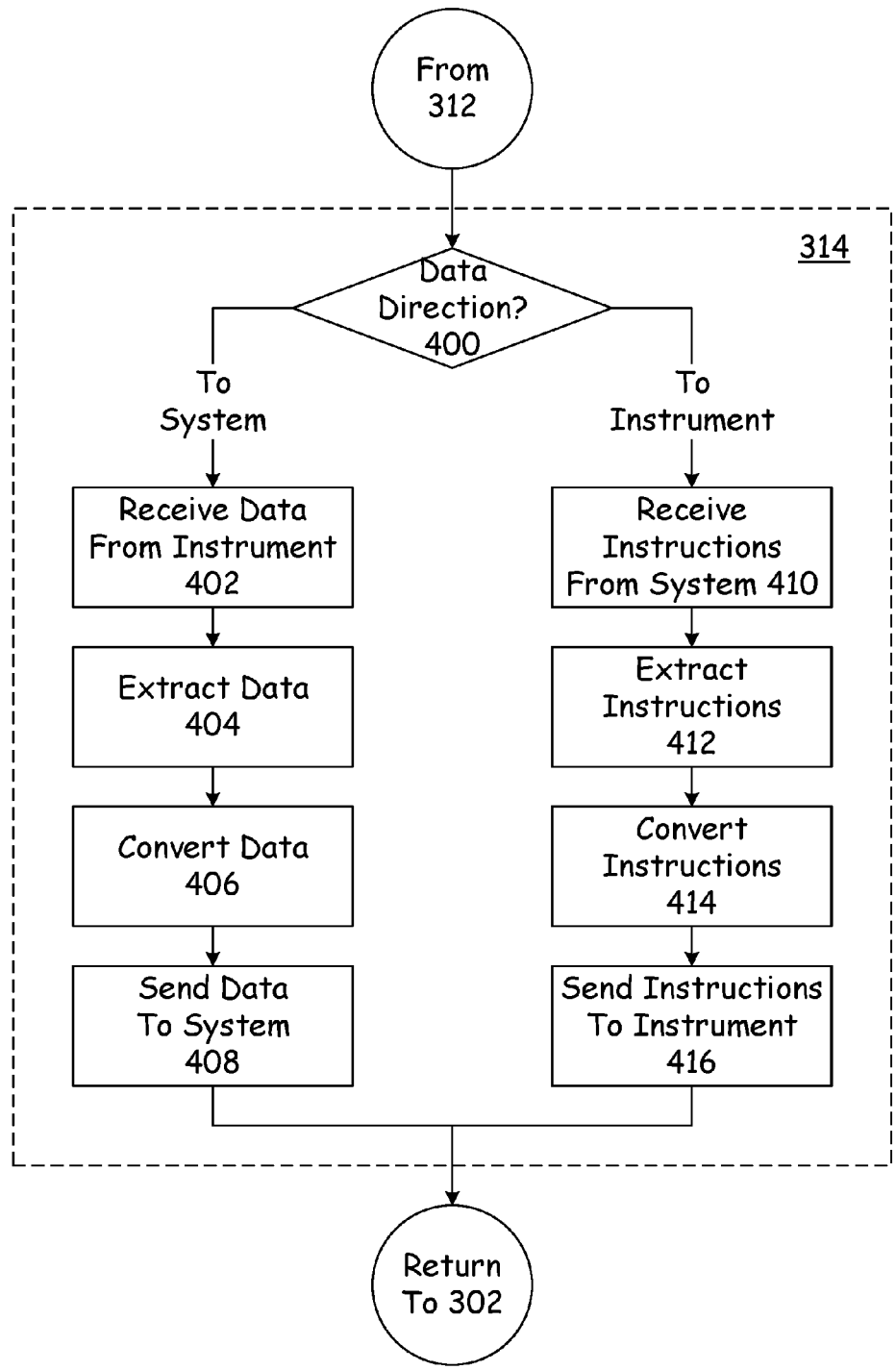
FIG. 4 is a more detailed flow chart for a portion of the operation of a centralized system according to an embodiment of the invention.

One method by which that can be accomplished is depicted in the flow chart of FIG. 4, in which more detailed steps for the operation of block 314 are provided. In accordance with the embodiment depicted in FIG. 4, a determination is made in block 400 as to which direction the data is going, be it either from the machine instrument 110 to the centralized system 100, or from the centralized system 100 to the machine instrument 110.

If from the machine instrument 110 to the centralized system 100 as given in block 402, then the data portion of the flow is extracted from the message, as given in block 404. This is enabled in one embodiment by the plugin 210, which understands the data protocol for the machine instrument 110, and knows what part of the transmission packet can be stripped off, which part is the machine data, what the formatting for the machine data is, and so forth. Thus, the communication module 126 can use this information from the plugin 210 (or in some embodiments the plugin 210 accomplishes these steps itself), to convert the data from the format of the machine instrument 110 as given in block 406, and create a new data message to send to other portions of the centralized system 100 as given in block 408, in the format that is recognized and used by the centralized system 100.

Similarly, if the data comprises instructions from the centralized system 100 to the machine instrument 110 as given in block 410, then the instruction portion of the flow is extracted from the message, as given in block 412, and then converted into a format as understood by the machine instrument 110, as given in block 414. This is enabled in one embodiment by the plugin 210, which understands the data protocol for the machine instrument 110, and knows what part of the transmission packet can be stripped off, which part is the instructions, what the formatting for the machine instructions is, and so forth. Thus, the communication module 126 can use this information from the plugin 210 (or in some embodiments the plugin 210 accomplishes these steps itself), to convert the instructions from the format of the centralized system 100, and create a new instruction message to send to the machine instrument 110 as given in block 416, in the format that is recognized and used by the machine instrument 110.

It is appreciated that not everything that is sent from the machine instrument 110 to the centralized system 100 is machine data, and not everything that is sent from the centralized system 100 to the machine instrument 110 is instructions. However, these terms are used so as to help keep clear some of the principles of communication as described above. In the final analysis, there are portions of the data packets that are flowing back and forth that are important to keep, and portions that represent metadata or protocol to the receiving system, be it either the centralized system 100 or the machine instrument 110, that need to be in a format that the receiving system understands. The plugin 210 associated with the socket 212 through which a given machine instrument 110 communications with the centralized system 100 understands which portions of the data packet are which, and creates an appropriate new data packet from the old data packet.

Further, in some cases the firmware 214 enables enhanced operation or new functions and capabilities of the machine instrument 110, and the new plugin 210 associated with that firmware 214 enables the centralized system 100 to make these new functions available to the technician, such as by presenting options for these functions on the user interface 122, such as user interfaces for configuration or presenting current data or others.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A centralized system for communicating with machine instruments of differing types, where operation of the machine instruments is determined by a firmware version that is independently and selectively updatable for each machine instrument, the centralized system comprising:
 a processor,
 a memory,
 a communication port, and
 a communication module comprising instructions residing in the memory and executed by the processor, the communication module for controlling communication between the centralized system and the machine instruments through the communication port, and having,
 sockets for communicating through the communication port,
 a library of plugins, each plugin associated with at least one of the machine instrument types and at least one firmware version, and a plugin manager for,
  communicating with a selected one of the machine instruments through a selected one of the sockets and determining the type and the firmware version of the selected machine instrument,
  searching the plugin library to find a plugin that is compatible with the type and firmware version of the selected machine instrument, and
  associating a compatible plugin with the selected socket such that the compatible plugin interprets communication between the centralized system and the machine instrument, which associating occurs without altering associations between other plugins and sockets and interrupting communications between the centralized system and any other machine instruments,
 wherein the compatible plugin,
  receives data in a first message from the associated machine instrument according to a first data protocol that is dependent upon the type and firmware version of the machine instrument, extracts the data from the first message, converts the data into a second data protocol associated with the centralized system, and sends the data in a second message according to the second protocol elsewhere in the centralized system, and
  receives instructions from the centralized system in a third message according to the second data protocol, extracts the instructions from the third message, converts the instructions into the first data protocol, and sends the instructions in a fourth message according to the first protocol to the associated machine instrument.

2. The centralized system of claim 1, wherein the communication module includes instructions for adding a new plugin to the plugin library when the plugin manager fails to find a plugin in the plugin library that is compatible with the type and firmware version of the selected machine instrument.

3. The centralized system of claim 2, wherein the communication module requests a designation of the new plugin from a user interface attached to the centralized system.

4. The centralized system of claim 2, wherein the communication module at least one of (1) requests a designation of the new plugin, and (2) receives the new plugin, from a global network source attached to the centralized system.

5. The centralized system of claim 2, wherein the communication module receives the new plugin from a removable memory unit attached to the centralized system.

6. The centralized system of claim 1, wherein the plugin library is contained in a portion of the memory that is removable from the centralized system.

7. A method for communicating between a centralized system and machine instruments of differing types, where operation of the machine instruments is determined by a firmware version that is independently and selectively updatable for each machine instrument, the method comprising the steps of:
    detecting a connection between one of the machine instruments and the centralized system at a socket of the centralized system through a communication port,
    requesting and receiving from the machine instrument a type and a firmware version of the machine instrument with a plugin manager of the centralized system,
    searching a library of plugins with the plugin manager for a compatible plugin that matches the type and firmware version of the machine instrument, wherein each plugin in the library is associated with at least one of the machine instrument types and at least one firmware version, and
    associating the compatible plugin with the socket such that the compatible plugin interprets communication between the centralized system and the machine instrument, which associating occurs without altering associations between other plugins and sockets and interrupting communications between the centralized system and any other machine instruments,
    wherein interpreting communications with the compatible plugin further comprises,
        receiving data in a first message from the associated machine instrument according to a first data protocol that is dependent upon the type and firmware version of the machine instrument, extracting the data from the first message, converting the data into a second data protocol associated with the centralized system, and sending the data in a second message according to the second protocol elsewhere in the centralized system, and
        receiving instructions from the centralized system in a third message according to the second data protocol, extracting the instructions from the third message, converting the instructions into the first data protocol, and sending the instructions in a fourth message according to the first protocol to the associated machine instrument.

8. The method of claim 7, further comprising issuing a request for a new plugin using the plugin manager when the plugin manager fails to find a compatible plugin in the plugin library.

9. The method of claim 8, wherein the plugin manager requests a designation of the new plugin from a user interface attached to the centralized system.

10. The method of claim 8, wherein the plugin manager requests designation of the new plugin from a global network attached to the centralized system.

11. The method of claim 8, wherein the plugin manager receives the new plugin from a removable memory unit attached to the centralized system.

12. The method of claim 8, wherein the plugin manager receives the new plugin from a global network attached to the centralized system.

13. The method of claim 8, wherein the plugin manager receives the new plugin from a global network attached to the centralized system.

14. A non-transient, computer-readable medium containing a machine program for enabling a computer to communicate with machine instruments of differing types, where operation of the machine instruments is determined by a firmware version that is independently and selectively updatable for each machine instrument, by causing a processor of the computer to perform steps comprising:
    detecting a connection between one of the machine instruments and the centralized system at a socket of the computer through a communication port,
    requesting and receiving from the machine instrument a type and a firmware version of the machine instrument with a plugin manager of the computer,
    searching a library of plugins with the plugin manager for a compatible plugin that matches the type and firmware version of the machine health instrument, wherein each plugin in the library is associated with at least one of the machine health instrument types and at least one firmware version, and
    associating the compatible plugin with the socket such that the compatible plugin interprets communication between the computer and the machine instrument, which associating occurs without altering associations between other plugins and sockets and interrupting communications between the computer and any other machine instruments,
    wherein the compatible plugin,
        receives data in a first message from the associated machine instrument according to a first data protocol that is dependent upon the type and firmware version of the machine instrument, extracts the data from the first message, converts the data into a second data protocol associated with the computer, and sends the data in a second message according to the second protocol elsewhere in the computer, and
        receives instructions from the computer in a third message according to the second data protocol, extracts the instructions from the third message, converts the instructions into the first data protocol, and sends the instructions in a fourth message according to the first protocol to the associated machine instrument.

15. The computer readable medium of claim 14, further comprising issuing a request for a new plugin using the plugin manager when the plugin manager fails to find a compatible plugin in the plugin library.

16. The computer readable medium of claim 15, wherein the plugin manager requests a designation of the new plugin from a user interface attached to the centralized system.

17. The computer readable medium of claim 15, wherein the plugin manager requests designation of the new plugin from a global network attached to the centralized system.

* * * * *